(12) United States Patent
Everett

(10) Patent No.: US 8,699,710 B2
(45) Date of Patent: Apr. 15, 2014

(54) CONTROLLED SECURITY DOMAINS

(75) Inventor: David Everett, Rustington (GB)

(73) Assignee: Royal Canadian Mint/Monnaie Royale Canadienne, Ottawa (CA)

(*) Notice: Subject to any disclaimer, the term of this patent is extended or adjusted under 35 U.S.C. 154(b) by 118 days.

(21) Appl. No.: 13/360,337

(22) Filed: Jan. 27, 2012

(65) Prior Publication Data

US 2012/0257751 A1 Oct. 11, 2012

Related U.S. Application Data

(60) Provisional application No. 61/437,147, filed on Jan. 28, 2011.

(51) Int. Cl.
*H04L 9/00* (2006.01)

(52) U.S. Cl.
USPC .......................................... 380/255; 713/155

(58) Field of Classification Search
USPC ....................................................... 380/255
See application file for complete search history.

(56) References Cited

U.S. PATENT DOCUMENTS

| | | | | |
|---|---|---|---|---|
| 7,103,784 B1 * | 9/2006 | Brown et al. | ...................... | 726/9 |
| 7,130,998 B2 * | 10/2006 | Balfanz et al. | ................ | 713/155 |
| 7,788,484 B2 * | 8/2010 | Paya et al. | ..................... | 713/156 |
| 8,037,298 B2 * | 10/2011 | Finlay | ............................ | 713/152 |
| 2002/0031230 A1 * | 3/2002 | Sweet et al. | ................... | 380/278 |
| 2002/0062451 A1 * | 5/2002 | Scheidt et al. | ................ | 713/201 |
| 2006/0218628 A1 * | 9/2006 | Hinton et al. | ..................... | 726/8 |
| 2006/0242407 A1 * | 10/2006 | Kimmel et al. | ............... | 713/166 |
| 2008/0022381 A1 * | 1/2008 | Le Saint | ........................... | 726/9 |
| 2009/0198997 A1 * | 8/2009 | Yeap et al. | ..................... | 713/155 |
| 2009/0228969 A1 * | 9/2009 | Garg et al. | ..................... | 726/10 |
| 2010/0049968 A1 * | 2/2010 | Dimitrakos et al. | .......... | 713/153 |
| 2012/0089833 A1 * | 4/2012 | Jirka et al. | .................... | 713/168 |

* cited by examiner

*Primary Examiner* — Matthew Smithers
(74) *Attorney, Agent, or Firm* — Pearne & Gordon LLP

(57) ABSTRACT

A security domain control method includes defining a sequential series of security domains; designating one of the security domains as a current domain; generating a plurality of security tokens under the current security domain, each security token being configured to enable a party to exchange cryptographically secured messages with another party that is holding any one of: a token generated under the current security domain; a token generated under at least one next security domain in the series; and a token generated under at least one previous security domain in the series; and subsequently designating a next one of the security domains in the series as a current domain.

7 Claims, 4 Drawing Sheets

CONTROLLED SECURITY DOMAINS

CROSS-REFERENCE TO RELATED APPLICATIONS

This application is based on, and claims benefit of, U.S. provisional patent application No. 61/437,147 filed Jan. 28, 2011, the entire content of which is hereby incorporated herein by reference.

MICROFICHE APPENDIX

Not Applicable.

TECHNICAL FIELD

The present disclosure relates to a system and methods for controlling security domains within an untrusted environment.

BACKGROUND

For the purpose of the present description, an "untrusted environment" shall be understood to mean any communications or networking environment in which it is possible for attackers to modify messages, delete messages or even add or replay messages. The public Internet is a common example of an untrusted environment, since it is not possible to prohibit attackers from modifying, deleting, adding or replaying messages. Cable and Satellite television distribution networks can also be untrusted, to the extent that, once set-top receiver/decoder units are distributed to end-users, they can be "hacked" to enable unauthorized access to programming content.

In order to enable secure communications in an untrusted environment it is usual to apply cryptographic algorithms and mechanisms to detect that a message is invalid for one or more of the previous reasons. Such cryptographic techniques require the participants to be in possession of the appropriate cryptographic keys. It is common for service providers or operators to implement a security domain in which a set of cryptographic keys are distributed to authorized parties. These keys can then be used to facilitate secure communications between those parties. For example, in Cable and Satellite television distribution networks, it is common practice for operators to encrypt their programming content using a private cryptographic key. The complementary public key is distributed to authorized subscribers as a security token, which enables users to decrypt and view the programming content. Private/public keys are also commonly used to implement a security domains (for example in the form of virtual private networks (VPNs)) in the public Internet.

It is well known that in a cryptographic security system of the type described above, it is necessary to update the keys (and frequently also the algorithms) in a timely fashion to ensure that the security of the system is preserved from advances made by the hacker fraternity. In general the operators of a security system may choose to change the keys and perhaps even increase their size at regular intervals. In some security systems it may even be desirable to change the algorithm. This is a common problem for example with Satellite TV conditional access systems which are a prime target for hackers.

The problem for the operator is that the overheads and risks of regularly changing the cryptographic components may be unacceptable and they may be persuaded to allow a longer period between key changes than is desirable. The complexity of such key management systems is well known.

In some systems (such as VPNs and Satellite television distribution networks) the task of updating keys is simplified, somewhat, by the fact that a user must connect to a secure (trusted) resource at some time. For example, in a VPN, a remote user must log onto a secure server in order to access the services of the VPN. In Cable and Satellite television distribution networks, the user's set-top receiver/decoder unit must be connected to a secure content server in order to receive programming content. In either case, the connection to the secure resource provides a means by which the age of the security token(s) stored on the user's remote device can be determined, and updated tokens distributed as required.

However, in some systems, a user might log into a secure resource only infrequently, or never. This type of situation could occur in some electronic commerce systems, for example where a user may interact with other users, but only rarely (if ever) log into a central server of the system. In such cases, date and time information associated with keys stored in a user's device cannot be trusted, and so cannot be used to determine the age of those keys, and the need for updating them. Furthermore, a reliable mechanism for updating a user's keys is lacking.

SUMMARY

The present disclosure sets out to provide a practical way by which operators of a security system can change the cryptographic parameters of security tokens in such a way that older tokens can be invalidated purely by the issuance of new tokens into circulation, and without reference to date and time information associated with any token(s) currently in use. The operator of the system can arbitrarily choose when to change these parameters, for example depending on the current threats and perceived vulnerabilities.

Accordingly, an aspect of the present invention provides a security domain control method includes defining a sequential series of security domains; designating one of the security domains as a current domain; generating a plurality of security tokens under the current security domain, each security token being configured to enable a party to exchange cryptographically secured messages with another party that is holding any one of: a token generated under the current security domain; a token generated under at least one next security domain in the series; and a token generated under at least one previous security domain in the series; and subsequently designating a next one of the security domains in the series as a current domain.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
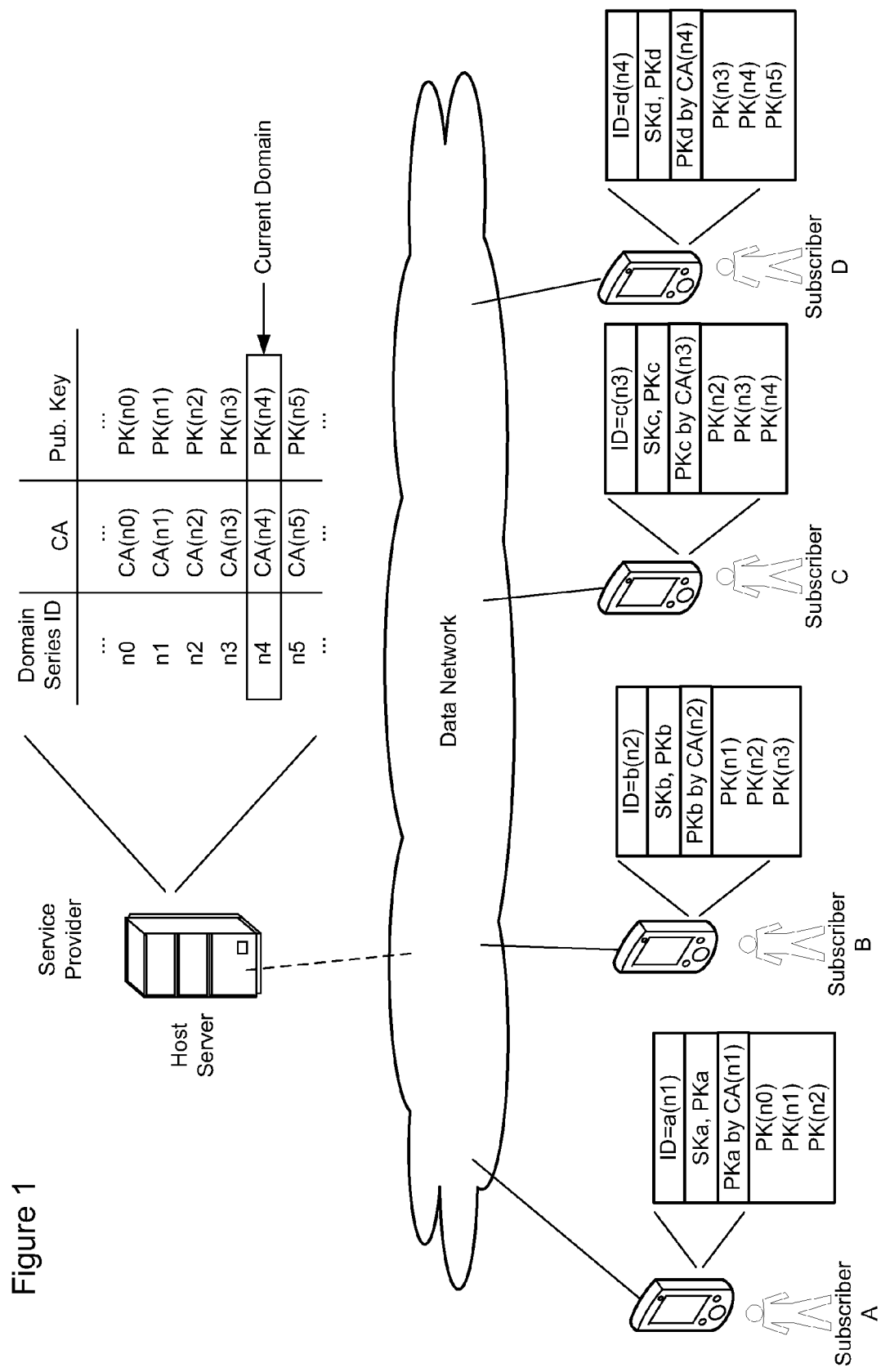
FIG. 1 is a block diagram showing a secure system implementing methods in accordance with a representative embodiment of the present invention.

For the purposes of the present disclosure, it is envisaged that an expiry date associated with security tokens can not be enforced in an untrusted environment, because there is no real-time clock associated with a security token that can be trusted. It would not be acceptable to trust the date and time reference of an uncontrolled terminal (eg. a subscriber's communications device) because of the ease with which such a date and time reference can be modified by a hacker.

The present invention provides a system in which the expiry of old security tokens can be implemented through a process of enforced obsolescence.

Accordingly, a service provider generates security tokens in accordance with a sequential series of security domains. Each security domain may be referenced by a domain ID which identifies its location within the series. It is anticipated that each security domain may comprise a respective Certification Authority (CA) for keys issued within that security domain, and respective cryptographic features (including algorithms), either of which may be the same or different from those of other security domains within the series. Each security token issued under a given security domain is configured to enable a party to exchange trusted messages with another party who has a security token issued under the same security domain or either of at least the two neighboring security domains within the series.

With this arrangement, the service provider can implement new security domains as and when they deem to be appropriate. As each new security domain is implemented, the parties receiving tokens issued under the current security domain are able to exchange trusted messages with parties holding tokens issued under the current domain, the immediately previous domain, and the next domain in the series. This provides interoperability between successive security domains, while at the same time ensuring that the usefulness of tokens issued under older domains progressively diminishes, because parties holding older tokens cannot exchange secure messages with holders of tokens being issued under the current domain. As a result, even in an environment in which parties are not forced to log into a central server which can force token updates, each party has an incentive to update their token(s) to the current security domain to avoid obsolescence and consequent inability to exchange messaging with other parties in the secure system.

In some embodiments, tokens may be generated and downloaded to subscribers' communications devices, using methods known in the art. In such cases, the subscribers' token(s) may be updated from time to time, for example when the subscriber uses their token to log into a secure server. In other embodiments, tokens may be embedded within physical devices (eg. smart cards, etc.) which are then distributed to users. In such cases, a service provider may provide a service whereby a subscriber can update the token(s) embedded within their device, or alternatively enable a user to exchange an old device for a new one.

Figure 2:
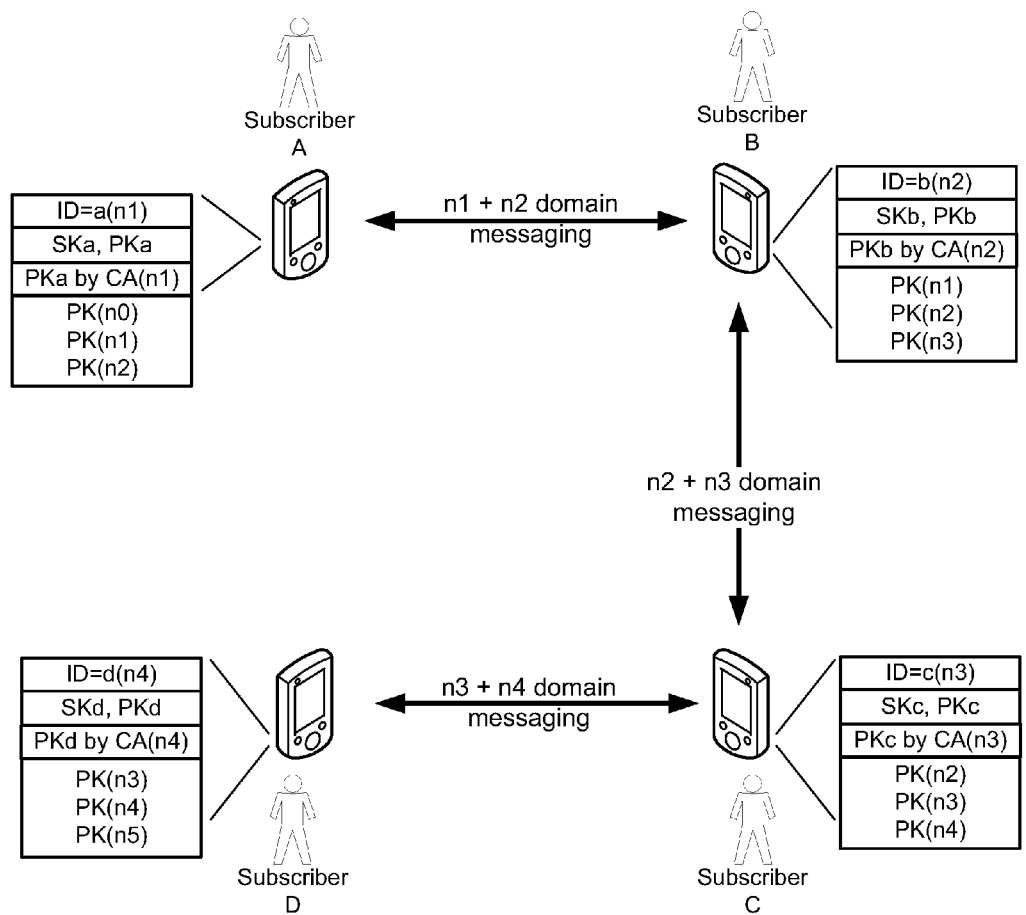
FIG. 2 is a block diagram illustrating possible message exchange transactions in the system of FIG. 1.

FIGS. 1 and 2 illustrate a secure system implementing aspects of the present invention. It will be noted that the illustrated system is based on public key cryptography, but those practiced in the art will understand that the same principles can be applied for the use of symmetric algorithms.

Referring to FIG. 1, a secure system comprises a host server (in this case maintained by a service provider) and a plurality of subscribers (four of which are illustrated), each of which are connected for communications through an untrusted data network, such as the public internet. The host server maintains a sequential series of security domains, one of which is designated as the "current domain".

In the illustrated embodiment, each security domain is referenced by a respective domain series ID, and includes a designated Certification Authority (CA) for that security domain, and a Public Key (PK) issued by the designated certification authority for that security domain. It is anticipated that, in most cases, the same Certification Authority may be designated for each security domain in the series, but this is not essential. In principle, each security domain in the series could have a different Certification Authority, if desired. However, in all cases, the Public Key (PK) issued by the designated certification authority for each security domain in the series must be unique, at least among the security domains in the series.

In operation, a new token is issued under the designated Current Domain, and includes: a respective unique token ID; respective Secret and Public Keys (SKx and PKx) unique to that token; a token public key certificate issued by the designated CA for that security domain; and the Public Keys [PK(nx)] of the current security domain as well as each of the immediately preceding and succeeding security domains in the series. In some embodiments, the token ID may include the domain series ID under which the token has been issued. In some embodiments, the public keys [PK(nx)] may be stored in the form of public key certificates. In the example of FIGS. 1 and 2, four representative subscribers (A-D) are illustrated, of which only Subscriber D holds a token issued under the presently designated Current Domain (n4). Each of Subscribers A-C hold older tokens which were issued when respective earlier domains of the series were designated as the current domain. Thus, Subscriber A has received a token issued under security domain "n1", which includes the domain series ID (n1); a certificate [Pka by CA(n1)] issued by the CA of security domain n1; and the public keys [PK(n0), PK(n1), PK(n2)] of security domain n1 as well as of security domains n0 and n2. Subscriber B has received a token issued under security domain "n2", which includes the domain series ID (n2); a certificate [Pkb by CA(n2)] issued by the CA of security domain n2; and the public keys [PK(n1), PK(n2), PK(n3)] of security domain n2 as well as of security domains n1 and n3. Subscriber C has received a token issued under security domain "n3", which includes the domain series ID (n3); a certificate [Pkc by CA(n3)] issued by the CA of security domain n3; and the public keys [PK(n2), PK(n3), PK(n4)] of security domain n3 as well as of security domains n2 and n4. Subscriber D has received a token issued under security domain "n4" (the designated Current Domain, which includes the domain series ID (n4); a certificate [Pkd by CA(n4)] issued by the CA of security domain n4; and the public keys [PK(n3), PK(n4), PK(n5)] of security domain n4 as well as of security domains n3 and n5.

With this arrangement, Subscribers A and B can exchange messages, because the overlapping sets of CA public keys in each token enables Subscriber A's n1-domain token to validate messages received from Subscriber B, and Subscriber B's n2-domain token can validate messages received from Subscriber A. Subscriber B can exchange messages with both Subscriber A and Subscriber C, again because of the overlapping sets of CA public keys in each subscribers' token. Similarly, Subscriber C can exchange messages with both Subscriber B and Subscriber D. However, Subscriber B is unable to exchange messages with Subscriber D, and Subscriber A is unable to exchange messages with either Subscriber C or Subscriber D. As such, as each successive security domain in the series is made current, tokens issued under older security domains become progressively less useful, and are ultimately made obsolete.

Figure 3:
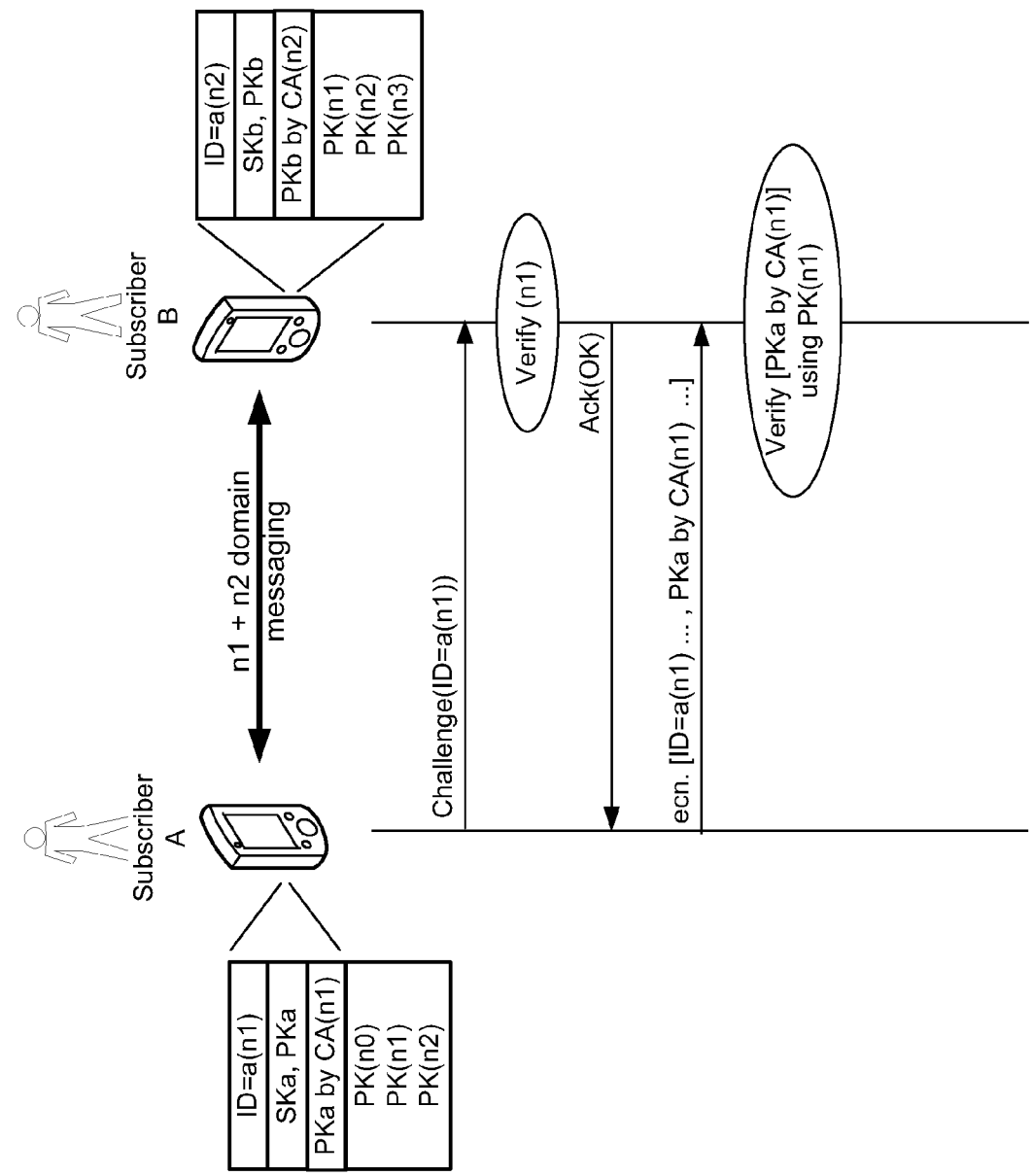
FIG. 3 is a message flow diagram illustrating a message exchange transaction in the system of FIG. 1.

FIG. 3 illustrates a possible message exchange scenario between Subscribers A and B. In this scenario, it is desired to send a trusted message from Subscriber A to Subscriber B. Thus, Subscriber A's communications device sends a challenge message containing an indication of the Domain Series ID of subscriber A's token. In some embodiments, the Domain Series ID may comprise part of the Subscriber A's token ID, but this is not essential. Upon receipt of the challenge message, Subscriber B's communications device can check the set of public keys contained in its token to determine whether or not it has a public key for Subscriber A's security domain (n1). In this case, the result of this verification check is "yes", so Subscriber B's communications device returns a corresponding Ack(OK) message to Subscriber A. Upon receipt of the Ack (OK) message, Subscriber A's communications device can use its token to generate and send a cryptographically secured message, including Subscriber A's certificate to Subscribers B. Upon receipt of the secured message, Subscriber B's communications device can use its token to obtain the public key (PK(n1)) of Subscriber A's security domain and verify the certificate contained in the received message.

The challenger/response scenario described above with reference to FIG. 3 suffers limitations in that either a real-time connection must be set up between the sending and receiving parties, or else a complex delayed-transfer protocol is required to handle the message transfer in the absence of a real-time connection. As noted above, in some embodiments, the token ID can be designed to include the domain series ID of the domain under which the token was issued. For example, in one possible embodiment, the token ID may be formatted as a 15-bit data field, of which the first 11 bits uniquely identify the token, and the trailing 4 bits comprise the domain series ID. Other suitable formats will be readily apparent to those of ordinary skill in the art, and may be used as desired. Embedding the domain series ID into the token ID in this manner offers an advantage in that it is not necessary for the receiving party (subscriber B in the above example) to send a challenge message to the sending party, as described above with reference to FIG. 3. All that is required is that the sending party know the token ID of the intended recipient. This information may be passed to the sending party by any of a variety of means, and so avoids the need for a real time connection between the two parties, implicit in a challenge/response transaction.

Figure 4:
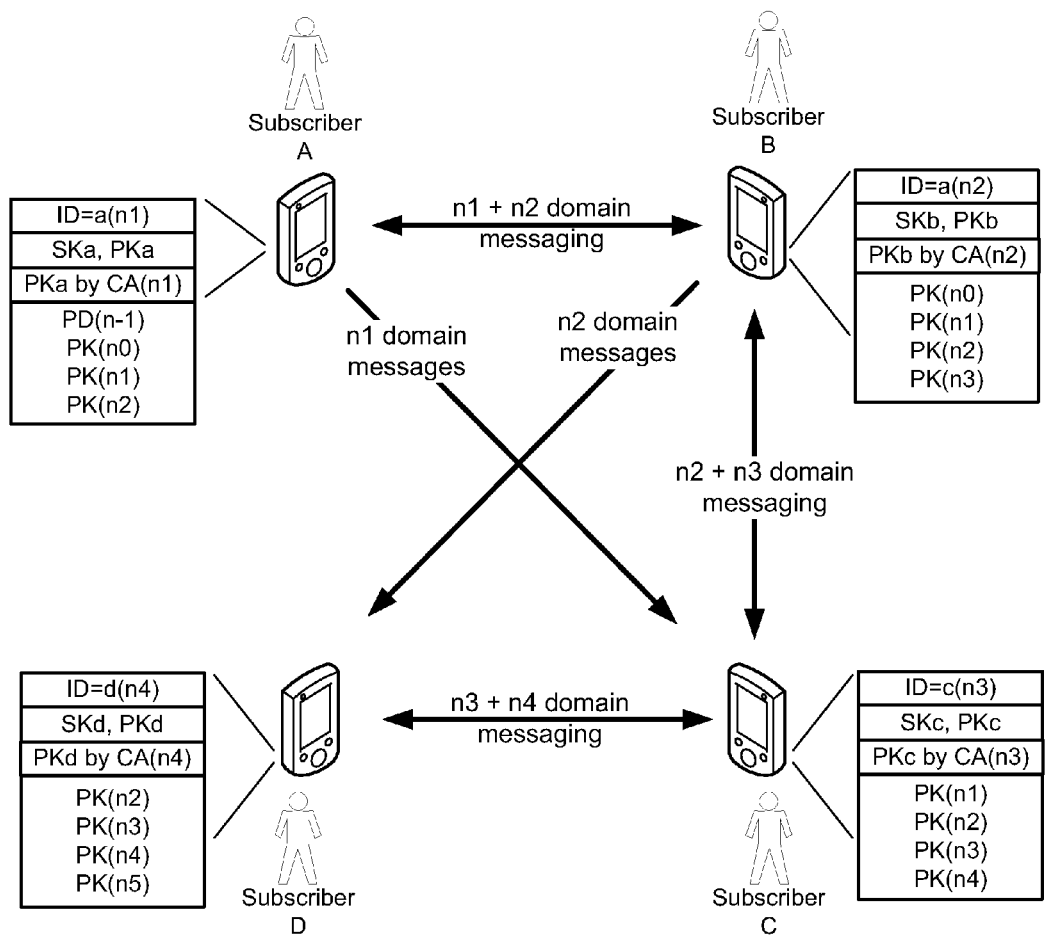
FIG. 4 is a block diagram illustrating possible message exchange transactions in a system according to a second embodiment of the present invention.

FIG. 4 illustrates an alternative embodiment in which each new token issued under a given Current Domain includes: respective Secret and Public Keys (SKx and PKx) unique to that token; a certificate issued by the designated CA for that security domain; and the Public Keys [PK(nx)] of the current security domain, the next security domain and both of the previous two security domains. Thus, for example, Subscriber C's token includes the domain series ID (n3); a certificate [Pkc by CA(n3)] issued by the CA of security domain n3 as in the embodiment of FIGS. 1 and 2; but now has four public keys [PK(n1), PK(n2), PK(n3), PK(n4)] of security domains n1-n4. Similarly, Subscriber D's token has the domain series ID (n4); a certificate [Pkd by CA(n4)] issued by the CA of security domain n4, as in the embodiment of FIGS. 1 and 2; but now has four public keys [PK(n2), PK(n3), PK(n4), PK(n5)] of security domains n2-n5. With this arrangement, Subscriber A is able to send messages to Subscriber C because Subscriber C's token includes the Public Key [PK(n1)] of Subscriber A's security domain, but Subscriber A is not able to receive messages from of Subscriber C, because Subscriber A's token does not contain the Public Key [PK(n3)] of Subscriber C's security domain and so cannot recognize Subscriber C's certificate. Similarly, Subscriber B is able to send messages to Subscriber D, but cannot receive messages from Subscriber D. This arrangement is useful in that it provides a more progressive degradation in the usefulness of older tokens, because parties holding older tokens experience a reduced ability to communicate with parties holding tokens issued under the current security domain, rather than being cut off completely.

As noted above, a user's security token(s) may be updated by replacing their old token(s) with a new token issued under the current security domain. However, a service provider may choose to update security tokens under the current domain; that is, without implementing the next security domain in the series. For example, when a subscriber logs into a secure server, the user's security token may be modified by adding or deleting CA public keys, and thereby alter the ability of the user to exchange trusted messaging with users holding tokens issued under other security domains.

In some embodiments, the firmware controlling the processor 10 may be configured to pass token updates to other tokens. For example, as noted above, a user's security token may be updated or modified without changing the security domain. In such a case, the processor's firmware may operate to communicate information regarding the change to other tokens having the same domain series ID, for example in an encrypted field embedded within content transfer messages. Upon receipt of a content transfer message, the processor 10 may decrypt the field to extract the token change information, and, if appropriate, update the content of its own token accordingly.

The embodiment(s) of the invention described above is(are) intended to be exemplary only. The scope of the invention is therefore intended to be limited solely by the scope of the appended claims.

I claim:

1. A method of controlling secure system, the method comprising:
   a host server defining a series of security domains;
   the host server sequentially designating each one of the series of security domains as a current domain, such that only one of the series of security domains is the current domain at any given time; and
   the host server generating a plurality of security tokens under the current security domain, each security token being configured to enable a first party to exchange cryptographically secured messages with a second party that is holding a token generated under the current security domain; a third party that is holding a token generated under a next security domain in the series; and a fourth party that is holding a token generated under a previous security domain in the series.

2. The method as claimed in claim 1, wherein each security token is configured to enable a party to exchange cryptographically secured messages with another party that is holding a token generated under two previous security domains in the series.

3. The method as claimed in claim 1, wherein each security domain is defined using Public Key Infrastructure (PKI), and comprises a respective public key.

4. The method as claimed in claim 3, wherein each security token comprises the respective public key of each one of the current security domain; the next security domain in the series; and the previous security domain in the series.

5. The method as claimed in claim 4, wherein each security token further comprises the respective public key of a second previous security domain in the series.

6. The method as claimed in claim 1, further comprising automatically updating a user's security token when the user logs into a secure server.

7. A non-transitory computer-readable medium comprising machine-readable software instructions for controlling a computer to implement the method of claim 1.

* * * * *